United States Patent [19]

Müller et al.

[11] Patent Number: 5,076,634
[45] Date of Patent: Dec. 31, 1991

[54] SUN VISOR FOR MOTOR VEHICLES

[76] Inventors: Hermann-Frank Müller, Reichenhallerstr. 42, 8000 München 90; Tassilo Pflanz, Homberger Str. 24, 6430 Bad Hersfeld, both of Fed. Rep. of Germany

[21] Appl. No.: 651,428

[22] Filed: Feb. 5, 1991

[30] Foreign Application Priority Data

Feb. 5, 1990 [DE] Fed. Rep. of Germany ....... 4003399

[51] Int. Cl.[5] .............................................. B60J 3/00
[52] U.S. Cl. .................................. 296/97.5; 296/97.12; 136/245
[58] Field of Search ..................... 296/97.5, 97.2, 97.1, 296/97.13, 97.9, 97.12; 136/245, 9

[56] References Cited

U.S. PATENT DOCUMENTS

| | | | |
|---|---|---|---|
| 4,940,272 | 7/1990 | Weick | 296/97.5 |
| 4,955,203 | 9/1990 | Sundhar | 136/245 |
| 4,984,137 | 1/1991 | Maemura | 296/97.2 |
| 4,988,140 | 1/1991 | Van Order | 296/97.2 |
| 5,004,138 | 4/1991 | Gabas | 296/97.5 |

FOREIGN PATENT DOCUMENTS 2744325  4/1979  Fed. Rep. of Germany .

*Primary Examiner*—Robert R. Song

[57] ABSTRACT

A sun visor for motor vehicles is provided that can be pivoted about its upper longitudinal rim. On that side that in a folded-down position faces toward the outside, the sun visor is provided with solar modules that are connected to at least one storage cell disposed in a recessed portion on the inner side of the sun visor. A pivot mounting of the sun visor can be snapped into and out of a catching device on the vehicle so that current stored from solar energy while driving can also be used outside of the vehicle. The sun visor can be supplemented with additional sun shields of appropriate construction.

20 Claims, 1 Drawing Sheet

SUN VISOR FOR MOTOR VEHICLES

BACKGROUND OF THE INVENTION

The present invention relates to a sun visor for automobiles and other motor vehicles, with the sun visor having an upper longitudinal rim through which extends a rod, one end of which is pivotably connected to catching means of the vehicle, and an opposite end of which is exposed and is detachably connected to a holding means of the vehicle.

Sun visors of this general type are known, for example from DE-OS 37 01 760. When the sun visor is folded down, the side that faces the driver or passenger can be provided with a mirror, possibly even an illuminated mirror.

It is an object of the present invention to provide a sun visor that not only serves its usual purposes as a sun shield and as an aid to, for example, check make-up but furthermore serves to generate current that can be used within and outside the vehicle without it having to be necessary to reconstruct the sun visor for this different task.

BRIEF DESCRIPTION OF THE DRAWINGS

This object, and other objects and advantages of the present invention, will appear more clearly from the following specification in conjunction with the accompanying schematic drawing, in which:

FIG. 2 is a cross-sectional view of the inventive sun visor and additional sun shield in various positions relative to

SUMMARY OF THE INVENTION

Figure 1:
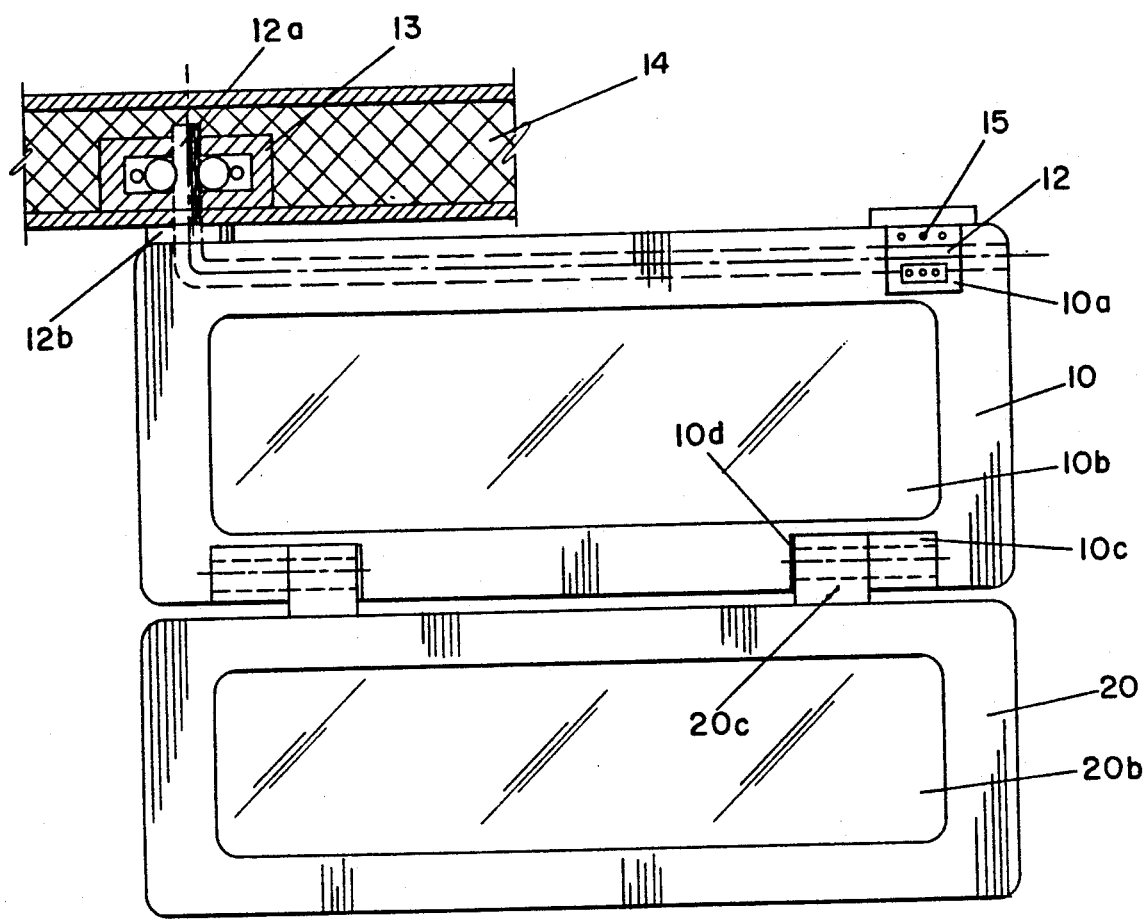
FIG. 1 shows one exemplary embodiment of the inventive sun visor with an additional sun shield hinged thereto.

The sun visor of the present invention is characterized primarily by: at least one solar module that is disposed on a side of the sun visor that in a folded-down position thereof faces toward the outside; and at least one storage cell that is disposed in a recessed portion provided in a side of the sun visor that in a folded-down position thereof faces toward the inside, with the at least one-storage cell being conductively connected with the at least one solar module for being charged thereby, whereby the one end of the rod of the sun visor is removable from and insertable into the catching means.

The weight of the sun visor has to be kept as low as possible in order to be able to operate the snap means of the sun shield in the vehicle without having to exert a great amount of force. For this purpose, monocrystalline or polycrystalline solar cells or thin-layer solar modules that have a high efficiency factor should be used; low weight storage cells such as disclosed in DE-OS 27 44 325 should also be used. An example of such a storage cell is, for example, a flat battery having synthetic foils of polypyrrol and lithium as electrode material with the addition of a gel. As a consequence of the material that is used, the additional advantage is provided that no environmental pollution will be created upon waste disposal (DE-OS 37 02 796). However, the storage cells can also have the known button cell form. Printed circuits, galvanic or metal layers that are applied without the use of electric current, or the like, can serve as a connection between the solar cells and the storage cells.

One or two sun visors provided with solar cells cannot always supply enough electricity due to their dimensions. It is therefore necessary to provide each sun visor with at least one additional sun shield that is similarly provided with solar cells and storage cells. This additional sun shield can be provided in such a way that it can, for example, be hinged to the sun visor and can be folded down. However, the additional sun shield can also be laterally removable via guide bars or can be pulled out from the bottom, as is known. The additional sun shield has the advantage that it can be adjusted in conformity to the position of the sun, for example by mechanical, electrical, magnetic, pneumatic, or hydraulic means. It is also possible for this adjustment to automatically follow the position of the sun, as disclosed, for example, in DE-OS 26 35 535, according to which the drive means is controlled by a light-sensitive element, such as a photocell or a selenium cell. In this way, the radiation of the sun is optimally utilized for the generation of electricity.

When the additional sun shield is installed, it is possible to leave it at the side window while the main sun visor shields against the rays of the sun at the front window. Thus, when driving through curves, it is not necessary to constantly shift the sun shield from the front window to the side window; the generation of current via the solar cells continues to take place regardless of whether the rays of the sun come in through the front or the side.

If it is desired that the rays of the sun also generate current when they come in through the rear of the vehicle, a sun visor can also be installed at the rear window. However, in order not to impair vision, such a sun visor should have a laminar construction. This sun visor could similarly be supplemented by one or two additional sun shields for the rear side windows. In most cases, it will not be necessary to also embody these sun shields in such a way that they can be snapped in and out, thus saving the necessary expenditure for doing so. However, it should in any case be possible to establish an electrically conductive connection between the solar cells of the rear window sun visor as well as the associated additional sun shields and the storage cells of the removable sun visors.

The openings or recessed portions in the various sun visors for accommodating the storage cells should be closed off by appropriate covers that snap into the respective recessed portions, so that the entry of, for example, dust and moisture can be prevented. In this connection, it is advantageous for these covers to be provided with a plug connection for current transfer and/or for the vehicle storage cell or battery.

The snapping in and out of the sun visor rod can be effected via numerous structural variations.

Further specific features of the present invention will be described in detail subsequently.

DESCRIPTION OF PREFERRED EMBODIMENTS

Referring now to the drawing in detail, FIG. 1 illustrates a sun visor 10, which has been supplemented by an additional sun shield 20. In a conventional manner, the sun visor can be pivoted along its upper longitudinal rim about a rod 12, which is bent at an angle of 90° at its end 12a. This bent or angled end 12a of the rod is inserted to the flange 12b into the fixing device 13, which is provided in the top or roof 14 of the vehicle. The fixing device 13 is embodied in such a way that the bent end 12a of the rod 12 can be removed therefrom and again reinserted therein. The fixing device can be comprised, for example, of balls that under the effect of an annular spring snap into an annular groove provided in the bent end 12a.

Provided at the other end of the longitudinal rim of the sun visor is an opening 10a through which the rod 12 passes, which at this location is held by a hook 15 that is attached to the roof of the vehicle.

On that side which in a folded-down position faces to the outside, the sun visor is provided with solar modules 16 that enable a direct conversion of sunlight to electrical current. In order to store this current, storage cells are disposed in an opening or recessed portion 10b of the sun visor. In the folded-down position, this recessed portion 10b is disposed on the inwardly directed side of the sun visor 10. To prevent dust and moisture from entering, the recessed portion 10b is closed off by a cover 17, 27 that can be snapped on.

Figure 2:
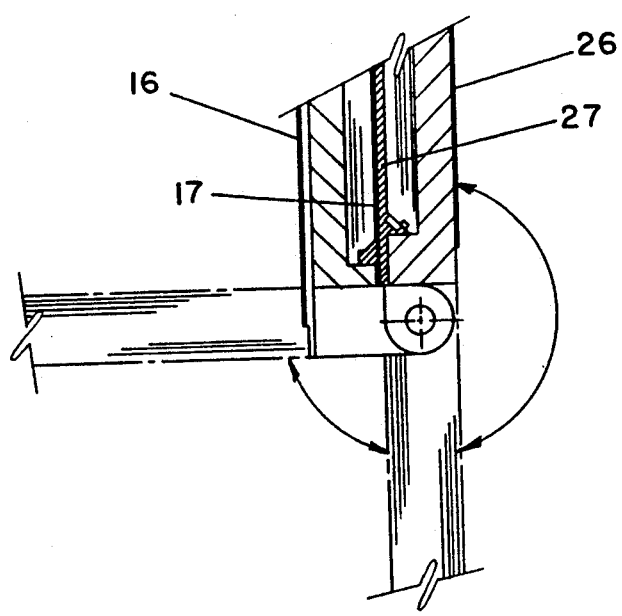

As can be seen from the embodiment illustrated in FIGS. 1 and 2, the sun visor 10 and the additional sun shield 20 are connected to one another via the hinge means 10c, 20c. The hinge portion 20c is disposed in a recess 10d of the sun visor 10, so that the additional sun shield can be pivoted up to an angle of 270°. It is to be understood that numerous structural variations are possible for connecting the sun visor and the additional sun shield. For example, it is possible to provide for the removal of the additional sun shield along bars that are attached to the sun visor, whereby the removal into a certain position of the sun visor where they face one another can occur mechanically or automatically with all structural variations, for example in conformity with the position of the sun.

The present invention is, of course, in no way restricted to the specific disclosure of the specification and drawings, but also encompasses any modifications within the scope of the appended claims.

What I claim is:

1. A sun visor for a motor vehicle, with said sun visor having an upper longitudinal rim through which extends a rod, one end of which is pivotably connected to catching means of said vehicle, and an opposite end of which is exposed and is detachably connected to a holding means of said vehicle, said sun visor further comprising:
    at least one solar module disposed on a side of said sun visor that in a folded-down position thereof faces toward the outside; and
    at least one storage cell disposed in a recessed portion provided in a side of said sun visor that in a folded-down position thereof faces toward the inside, with said at least one storage cell being conductively connected with said at least one solar module for being charged thereby, and with said one end of said rod being removable from and insertable into said catching means.

2. A sun visor according to claim 1, in which said solar module is a monocrystalline solar cell.

3. A sun visor according to claim 1, in which said solar module is a polycrystalline solar cell.

4. A sun visor according to claim 1, in which said solar module is a thin-layer solar module.

5. A sun visor according to claim 1, which includes at least one additional sun shield for augmenting said sun visor, whereby on a side that in an operating position faces toward the outside said sun shield is provided with at least one solar module, and on a side that faces toward the inside said sun shield is provided with a recessed portion having at least one storage cell that is connected with said at least one solar module of said sun shield and is connectable to said at least one storage cell of said sun visor proper.

6. A sun visor according to claim 5, in which said additional sun shield is removable from said sun visor in a downward direction.

7. A sun visor according to claim 5, in which said additional sun shield is removable from said sun visor in a lateral direction.

8. A sun visor according to claim 5, which includes means for pivotably interconnecting said additional sun shield to an outer edge of said sun visor.

9. A sun visor according to claim 8, which includes means for adjusting a pivot position of at least one of said sun visor and said additional sun shield.

10. A sun visor according to claim 9, in which said adjusting means automatically adjust said pivot position.

11. A sun visor according to claim 11, in which said automatic adjustment is a function of the position of the sun.

12. A sun visor according to claim 5, which includes means for connecting at least some of said storage cells of said sun visor and said sun shield to a current-consuming device.

13. A sun visor according to claim 5, in which each of said recessed portions for said storage cells is provided with a cover for sealing out dust and moisture.

14. A sun visor according to claim 13, in which said cover is provided with means for receiving a plug contact of a current-consuming device.

15. A sun visor according to claim 5, which is disposed on the rear window of said vehicle, with an electrically conductive connection being provided between said at least one solar module thereof and said at least one storage cell of at least one of said sun visor and said removable sun shield.

16. A sun visor according to claim 1, in which said one end of said rod of said sun visor is provided with an annular recess that is engaged by spring-loaded arresting means of said catching means of said vehicle.

17. A sun visor according to claim 16, in which said arresting means are balls.

18. A sun visor according to claim 1, which includes means for winding up said sun visor into or onto a roof position of said vehicle.

19. A sun visor according to claim 18, which includes a flexible carrier material that is provided with solar cells in a laminar manner.

20. A sun visor according to claim 18, which includes a flexible carrier material having a light-absorbing coating.

* * * * *